United States Patent [19]
Gordon et al.

[11] 3,853,672
[45] Dec. 10, 1974

[54] FALLING STRAND DEVOLATILIZER USING ONE PREHEATER WITH TWO FLASH CHAMBERS

[75] Inventors: Robert E. Gordon, Monson; George A. McNeill, West Springfield, both of Mass.

[73] Assignee: Monsanto Company, St. Louis, Mo.

[22] Filed: Jan. 9, 1973

[21] Appl. No.: 322,242

[52] U.S. Cl. ............... 159/2 MS, 159/3, 159/27 D, 159/18, 159/DIG. 10
[51] Int. Cl. ........ B01d 1/28, B01d 1/16, B01d 1/06, B01d 1/26
[58] Field of Search ......... 159/18, 2 MS, 3, 4 VMS, 159/4 MS, 27 D, 27 R, 13 A

[56] References Cited
UNITED STATES PATENTS

| | | | |
|---|---|---|---|
| 1,783,464 | 12/1930 | Follain | 62/152 |
| 1,799,478 | 4/1931 | Peebles | 159/2 MS |
| 2,708,721 | 5/1955 | Ziffer | 250/43.5 FL |
| 2,768,813 | 10/1956 | Boyer | 159/28 R UX |
| 2,970,089 | 1/1961 | Hunt et al. | 203/91 |
| 2,974,130 | 3/1961 | Moberly | 260/94.7 |
| 3,004,900 | 10/1961 | Hunt et al. | 202/191 |
| 3,035,634 | 5/1962 | Waine et al. | 159/44 |
| 3,080,354 | 3/1963 | Moon | 260/94.95 |
| 3,190,867 | 6/1965 | Oldweiler et al. | 159/DIG. 10 |
| 3,303,106 | 2/1967 | Standiford, Jr. | 159/18 X |
| 3,481,835 | 12/1969 | Carnavos | 159/18 X |
| 3,487,873 | 1/1970 | Bromley et al. | 159/13 A |

FOREIGN PATENTS OR APPLICATIONS
568,236  1/1933  Germany ............... 159/18

*Primary Examiner*—Jack Sofer
*Attorney, Agent, or Firm*—Edward P. Grattan; Thomas B. Leslie; Joseph S. Nelson

[57] ABSTRACT

An improved falling strand devolatilizer apparatus utilizing a single shell and tube heat exchanger assembly followed by a pair of flash tanks, the flash tanks being sequentially positioned one above the other spatially and having a variable fluid transfer regulation means functionally positioned between the first and second flash tanks. A pressure differential between the first and second flash tanks is maintainable during devolatilizer operation by controlling the fluid level in the bottom of the first tank within predetermined limits by a control assembly associated with the fluid transfer regulation means.

5 Claims, 6 Drawing Figures

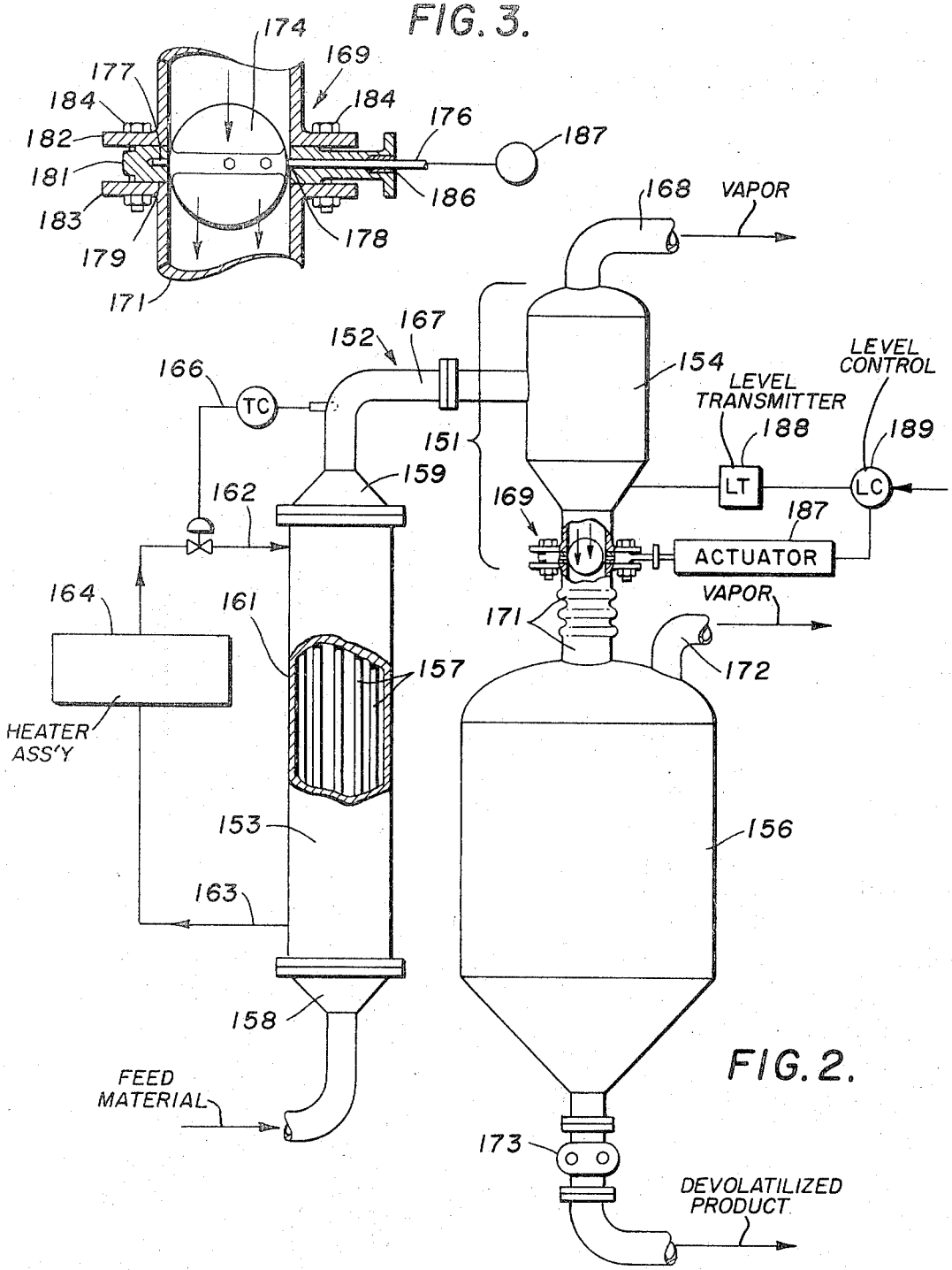

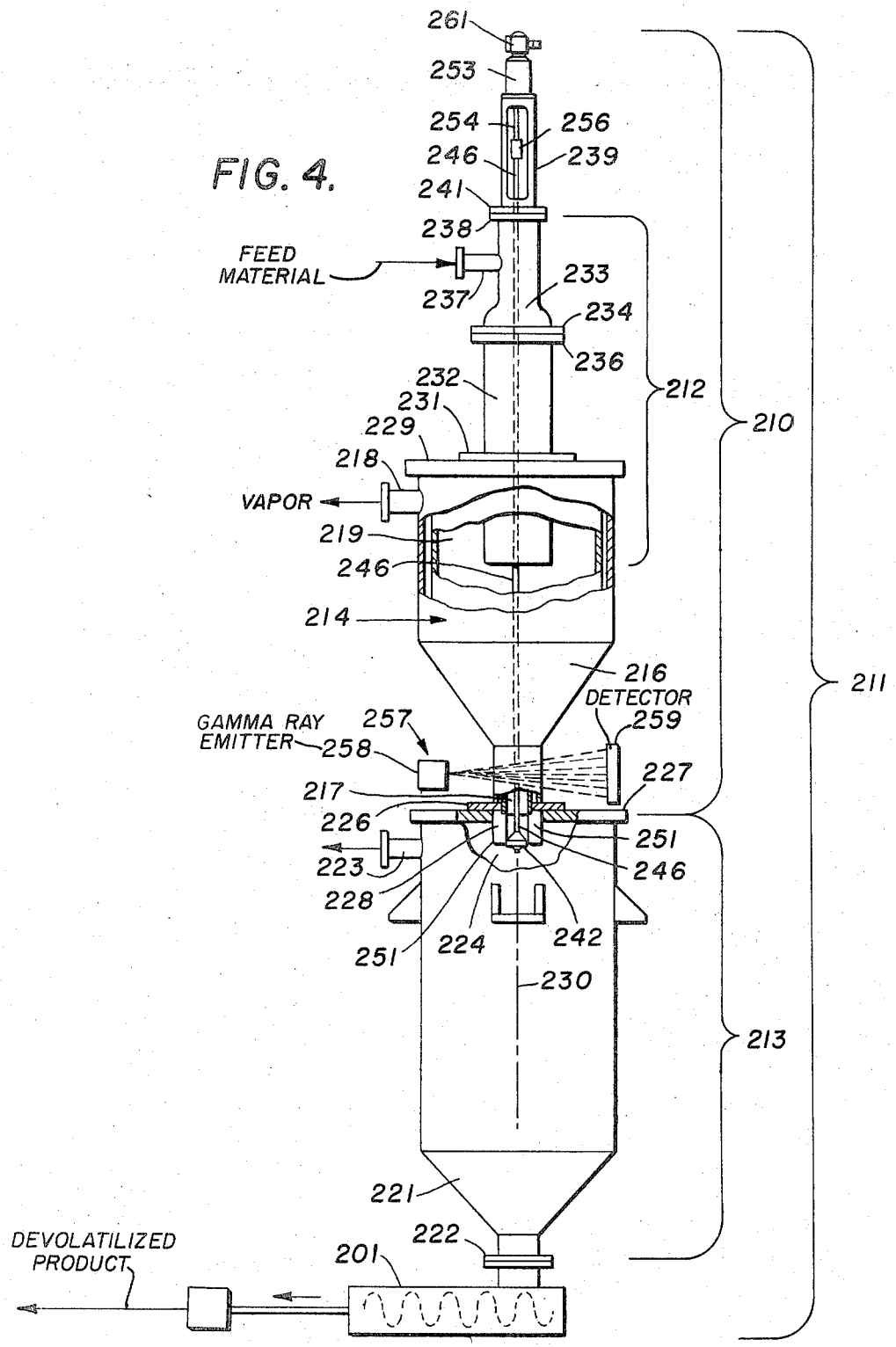

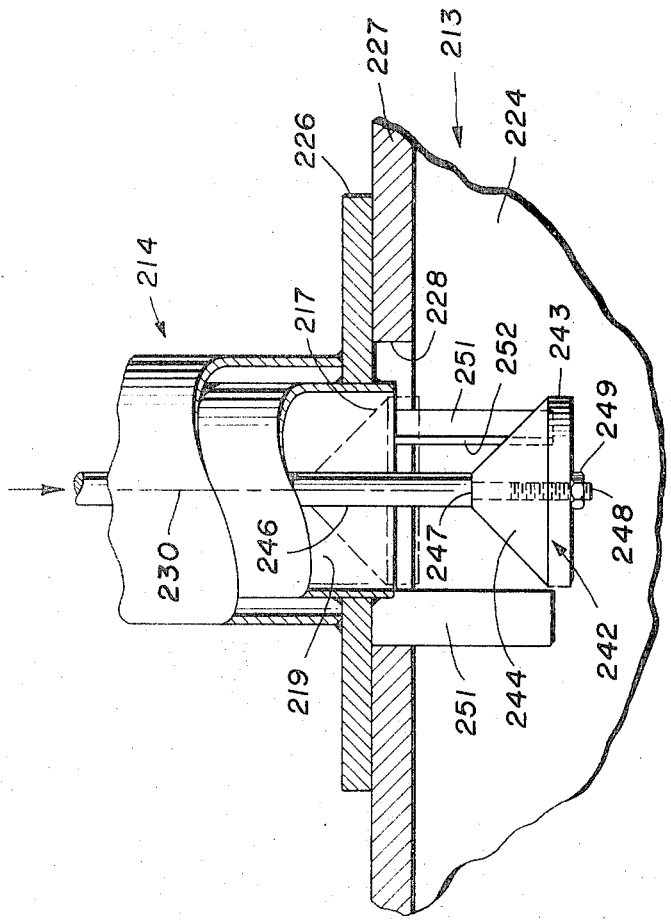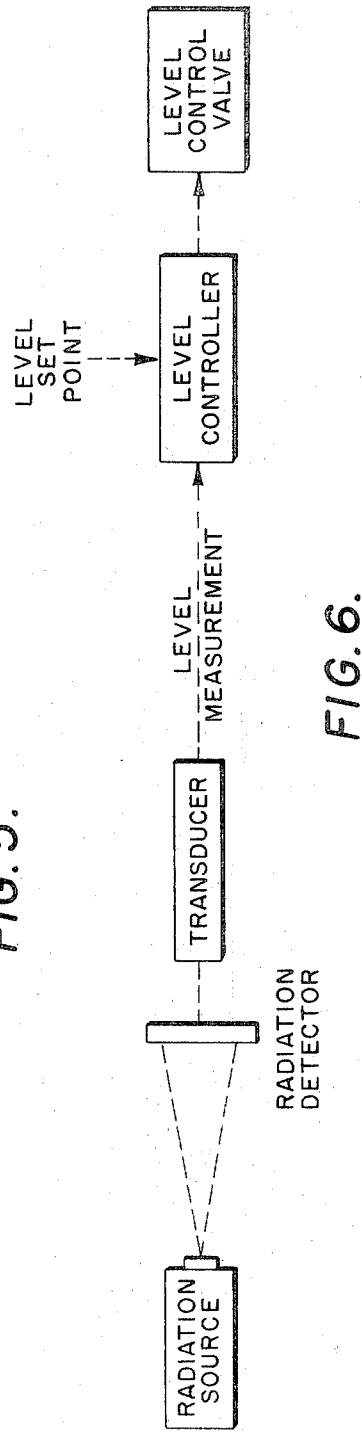

FALLING STRAND DEVOLATILIZER USING ONE PREHEATER WITH TWO FLASH CHAMBERS

BACKGROUND

Falling strand devolatilization has been employed for many years to separate a volatile component from a liquid component. Such devolatilization procedure has been especially useful in the manufacture of polymers, such as homopolystyrene where, as in a continuous mass polymerization process, a fluid mixture of homopolystyrene with styrene monomer results, which mixture must be subjected to a post polymerization treatment to remove the unreacted styrene monomer therefrom. For such a removal, a falling strand devolatilizer is a convenient piece of apparatus.

A falling strand devolatilizer as known to the prior art comprises as a preheater a shell and tube heat exchanger adapted to feed heated fluid material from the tubes thereof into a flash tank. An upper portion of a flash tank bears an outlet port which is typically interconnected with a source of vacuum. A fluid mixture being devolatilized is first subjected to a preheating step in the shell and tube heat exchanger after which the so heated mixture is subjected to a flashing step in which the so heated mixture is discharged into the flash tank wherein the conditions of pressure and temperature are so regulated that volatiles (e.g., especially monomer) are above their boiling point while the desired component (e.g., homopolystyrene) is maintained below its boiling or decomposition point. Vaporization of volatiles is promoted by continuously exhausting vapor of volatiles through the vacuum outlet port of the flash tank. Commonly, as in the falling strand devolatilization of a polymer such as homopolystyrene admixed with styrene monomer, it is preferred to subject the polymer/monomer mixture to two successive stages of falling strand devolatilization, the conditions of temperature and pressure employed in the second stage being somewhat more rigorous than those used in the first stage. For each such stage of devolatilization, it has heretofore been thought necessary to employ a heat exchanger assembly preceding each of the two flash tanks.

It has now been discovered that in two stage fallinng strand devolatilization, the presence of a second preheater can be completely avoided between the first and second flash vaporization tanks. This discovery makes it possible to eliminate a costly sub-assembly heretofore thought necessary in two successive stages of falling strand devolatilization. In addition, this discovery permits the pressure to be varied in the first chamber without affecting the pressure or the resulting residual monomer in the second chamber. Regulation of this first chamber pressure can be used to control the residence time through the preheater, and the stripping effect of high boiling materials and the properties associated with the time/temperature history. Furthermore, the elimination of a second heat exchanger can improve the properties of many polymeric materials by minimizing the time/temperature history.

To accomplish the elimination of the second heat exchanger, and, at the same time, maintain during devolatilizer operation an adequate pressure differential between the first flash zone and the second flash zone, in further accordance with the present invention, it has been found necessary to interpose between the first and the second flash vaporization tanks in place of the shell and tube heat exchanger, a variable fluid transfer regulation means such as a valve or a pump which is adapted to maintain a prechosen fluid material level in the bottom of the first flash vaporization tank. Such a fluid level is used to maintain during apparatus operation a necessary and desirable pressure differential between the first and the second flash vaporization tanks and still permit fluid material to flow from the one into the second flash tank continuously.

SUMMARY

The new and very useful devolatilizer apparatus of the present invention employs a shell and tube heat exchanger means which is adapted for input, passage through, and discharge from, the tubes thereof of process fluid, and is further adapted for the receipt, passage through, and discharge from the shell interior thereof of heat exchange fluid, thereby to achieve heat transfer from the heat exchange fluid to the process fluid.

The devolatilizer apparatus of this invention further employs a first and a second vessel. Each such vessel has a tapered lower region terminating in a discharge port. Each vessel is also equipped with a vapor take-off port in an upper portion thereof, and an output port means adapted to discharge process fluid thereinto at a point between the discharge port and the vapor take-off port. In addition, each such vessel is equipped with jacket means for heat exchange purposes, there being appropriate heat exchange fluid entrance and exit ports on each vessel for purposes of heating each vessel to a separate predetermined temperature, if desired. The first vessel is positioned spatially above the second vessel and the respective vessels are interconnected in such a way that the discharge port of the first vessel interconnects with the input port means of the second vessel. Preferably, the vessels have a common axis.

The heat exchanger means has the discharge ends of the tubes thereof interconnected with the input port means of the first vessel.

Connected with the vapor take-off port of the first vessel is a first gas pump means adapted to maintain desired (preferably sub-atmospheric) pressures in the first vessel and a second gas pump means is interconnected with the vapor take-off port of the second vessel and adapted to maintain desired (preferably sub-atmospheric) pressures in the second vessel but below the desired pressures maintained in the first vessel.

Interconnected with the input ends of the heat exchanger means is a first liquid pump means which is adapted to deliver process fluid thereto under pressure sufficient to drive the process fluid through such heat exchanger means and into the first vessel. A second liquid pump means interconnects with the discharge port of the second vessel and is adapted to remove process fluid therefrom without loss of desired pressure in the second vessel.

A variable fluid transfer regulation means is functionally positioned between the first and the second vessel and is adapted to vary the rate of process fluid flow from the discharge port of the first vessel through the input port means of the second vessel.

An actuator means engaged with the fluid transfer regulation means is adapted, in response to control signals applied thereto, to operate such fluid transfer regulation means.

A level sensing means is associated with the first vessel and adapted measure fluid level in bottom regions thereof and to generate a signal representative thereof. A controller means, which is responsive to a predetermined set signal and is functionally interconnected with the level sensing means and with the actuator means, is adapted to apply control signals to the actuator means after comparing the level sensing means signal to the set signal. Thus, the controller means is adapted, in combination with the actuator means, the level sensing means, and the variable fluid transfer regulation means, to regulate the quantity of fluid moved from the first into the second vessel during operation of the devolatilizer apparatus.

FIGURE DESCRIPTION

The invention is better understood by reference to the attached drawings wherein:

FIG. 2 is a side elevational view of another embodiment of a falling strand devolatilizer apparatus of the present invention, some parts thereof broken away and some parts thereof shown in section;

FIG. 3 is a vertical sectional view illustrating details of the valve assembly used in the apparatus of FIG. 2, some parts thereof broken away and some parts thereof shown in section;

FIG. 4 is a side elevational view of one falling strand devolatilizer apparatus incorporating an embodiment of the present invention, some parts thereof broken away and some parts thereof shown in section;

FIG. 5 is an enlarged, detailed view in side elevation of the valve assembly used in the embodiment of FIG. 4, some parts thereof broken away and some parts thereof shown in section;

FIG. 6 is a block diagrammatic view of a level control system suitable for use with the valve assembly of FIG. 5.

DETAILED DESCRIPTION

Figure 1:
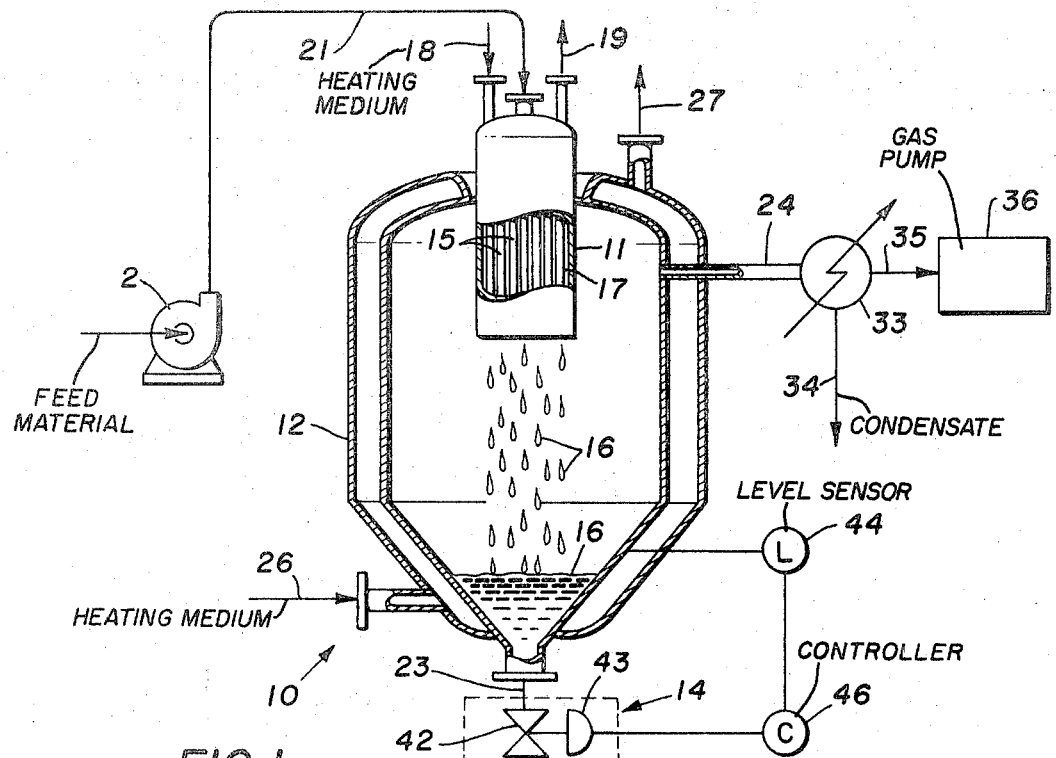
FIG. 1 is a diagrammatic and schematic representation of one embodiment of the present invention.
Figure 1:
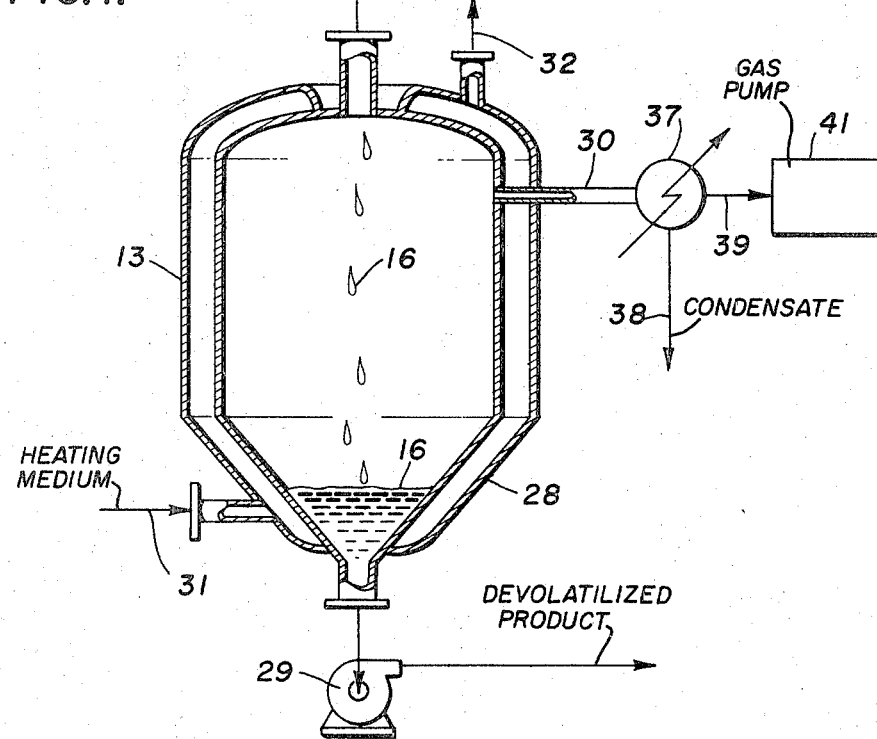

Referring to FIG. 1, there is seen illustrated an embodiment of this invention herein designated in its entirety by the numeral 10. Falling strand devolatilizer 10 can be considered to comprise four main working assemblies, a shell and tube heat exchanger assembly 11, a first flash tank 12, a second flash tank 13, and a fluid transfer regulator assembly herein designated in its entirety by the numeral 14.

The shell and tube heat exchanger assembly 11 is adapted for input, passage through, and discharge from, the tubes 15 thereof of process fluid 16. This heat exchanger assembly 12 is further adapted for receipt, passage through, and discharge from, the shell interior 17 thereof of heat exchange fluid (not shown) for heat transfer from said heat exchange fluid to said process fluid 16. The heat exchange fluid (which can be, for example, a hot oil) enters the shell interior 17 through an input line 18 and exits therefrom through an output line 19. Process fluid 16 enters heat exchanger 11 through input line 21 and exits from the bottom thereof into the interior of the first flash tank 12 in the form of strands or elongated drops, typically.

The first flash tank 12 has a tapered lower region 22 which terminates in a discharge port that directly connects with second flash tank 13 here by means of pipe 23. Tank 12 also has a vapor take-off port which interconnects the interior of tank 12 with a pipe 24, the vapor take-off port being in an upper region of the tank 12. Tank 12 is of double walled jacketed construction for purposes of controlling the interior temperatures of tank 12 during operation of the devolatilizer 10. Thus, a heat exchange fluid, for example, a hot oil, enters the jacket of tank 12 through a pipe 26 and exits therefrom through a pipe 27 during operation of the devolatilizer 10.

The second flash tank 13 also has a tapered lower portion or region 28 which terminates in a discharge port, this discharge port directly feeding a melt pump 29. A vapor take-off port in the upper portion of flash tank 13 connects the interior of this tank with a line or pipe 30. Tank 13 has a double walled jacketed construction for purposes of controlling the interior temperatures thereof during operation of devolatilizer 10. Thus, a heat exchange fluid such as a hot oil enters the jacket as through a pipe 31 and exits therefrom as through a pipe 32. Tank 12 is positioned spatially above tank 13 and heat exchanger assembly 11 is positioned spatially above the tank 12 but is permitted to project down thereinto. Heat exchanger assembly 11 and tanks 12 and 13 are generally coaxial with one another. The heat exchanger assembly is permitted to project down into the first flash tank 12 since such a configuration has been found to enhance vapor separation from process fluid 16 during operation of the devolatilizer 10.

Interconnected with pipe 24 is a condenser 33 which is used to liquify vapors separated from process fluid 16 in the interior of tank 12. Condensate from condenser 33 is conveniently removed therefrom as through a pipe 34 for recycle and/or purge, as desired. Condenser 33 interconnects with a vacuum pump 36 which is adapted to maintain desired subatmospheric pressures in the interior of tank 12.

Pipe 30 interconnects the interior of tank 13 with a condenser 37. Condensate from condenser 37 is conveniently collected as through a pipe 38 for recycle and/or purge as desired. A vacuum pump 41 interconnects through a line 39 with condenser 37 by which the interior of the tank 13 as maintained at a predesired low pressure during operation of devolatilizer 10, the pressure in the tank 13 being lower than the pressure in the tank 12, characteristically. While the devolatilizer 10 may be operated without the use of condensers 33 and 37, those skilled in the art will appreciate that these condensers are a practical requirement in the operation of a commerical non-polluting process.

A process fluid to be devolatilized is fed into line or pipe 21 from a first liquid pump means 2, the process fluid reaching pump 2 from a preceding operation earlier in the process, for example, a mass polymerization step as in the case of the manufacture of homopolystyrene by continuous polymerization. Pump 2 is adapted to deliver the process fluid to the heat exchanger assembly 11 and through same. The melt pump 29 is adapted to remove the process fluid 16 from the second tank 13 at the close of the devolatilization.

Between the tanks 12 and 13 is a variable fluid transfer regulation means 42, which in a specific embodiment of the present invention, as those skilled in the art will appreciate, may be a pump or a valve assembly. This fluid transfer regulation means is functionally positioned between the first and the second vessels 12 and 13, respectively, and is adapted to vary the rate of process fluid flow from the bottom of tank 12 into the top of tank 13.

An actuator 43 is engaged with the transfer regulation means 42 and is adapted, in response to control signals applied to the actuator 43, to operate the transfer regulation means 42.

A level sensing means 44 is associated with the tank 12, preferably fluid level in a bottom portion of lower region 22 of the tank 12. Level sensing means 44 is adapted to measure the level of process fluid 16 in tank 12 and to generate a signal representative thereof.

A controller 46, typically responsive to a predetermined set signal, functionally interconnects the level sensing means 44 with the actuator means 43. The controller 46 is adapted to apply control signals to the actuator 43 after comparing the level sensing means signal 44 to the set signal. Actuator 43, sensor 44 and controller 46 are conventional devices which are familiar to those skilled in the art.

While, as the fluid transfer regulator 42, a conventional device may be employed, some types of regulators are more suitable than others, owing to conditions of use, equipment size, viscosity considerations associated with a particular fluid being processed and the like. Valve means are generally preferred as fluid transfer regulators. The following embodiments illustrate apparatus of this invention utilizing valve means for fluid transfer regulations.

Shown in FIGS. 2 and 3 is an embodiment of the present invention employing, as the fluid transfer regulator, a butterfly valve assembly. Here, a devolatilizer which is designated in its entirely by the numeral 152 can be considered to be composed of a shell and tube heat exchanger assembly 153, or first flash tank 154 and a second flash tank 156. In the shell and tube heat exchanger assembly 153, process fluid (not shown) is input to the tubes 157 of exchanger assembly 153 through header 158 and exits from the heat exchanger assembly 153 through header 159. The shell portion 161 of heat exchanger assembly 153 is used for circulation of a heat exchange fluid (not shown) which enters the shell 161 as through a pipe 162, circulates within the shell 161 about tubes 157 and exits from the shell 161 as through a pipe 163. The heat exchange fluid is conveniently heated in a heater assembly 164. The temperature of the heat exchanged fluid entering the shell 161 through pipe 162 is conveniently regulated by means of a temperature control means 166 which is conventional in construction. From the header 159, the process fluid is conducted into the vessel 154 via pipe means 167 where vapor separated from the process fluid is removed by means of the pipe 168, the pipe 168 being interconnected with a vapor recovery means (nor shown) and vacuum pump means (not shown). A valve assembly, herein designated in its entirety by the numeral 169 at the lower end of the tank or vessel 154 meters process fluid at a controlled rate from the vessel 154 into the vessel 156, through the longitudinally expandable pipe 171. In the tank 156, process fluid has further volatiles separated thereform which removed through a pipe 172, the pipe 172 being connected to a vapor recovery means (not shown) and vacuum pump means (not shown). Process fluid is removed from the second flash tank 156 bottom portion through a melt pump 173.

Constructional details of the valve assembly 169 are illustrated in FIG. 3. Across an upper section of pipe 171 extends a valve disc 174 being adapted for rotational movements about a generally horizontal axis, the valve disc 174 is adapted to substantially shut the pipe 171 when the valve disc 174 is in a relatively horizontal position thereto. Associated with valve disc 174 are valve stems 176 and 177 which protrude in diametrically opposed fashion from valve disc 174 on opposite side edges thereof. Stem 176 is journaled for rotational movements in the bearing assembly 178, while 177 is journaled for rotational movements in bearing assembly 179. Stems 176 and 177 adapt the valve disc 174 for rotational movements. Bearings 178 and 179 are mounted in a ring 181. Ring 181 is adapted to be mounted across pipe 171 between a pair of flanges 182 and 183 as by means of a nut and bolt assemblies 184 or the like. The valve assembly 169 is an unlined all metal assembly suitable for utilization in the characteristically strenuous operating environments associated with, for example, wiped film devolatilizers used for devolatilizing polystyrene. Stem 176 extends through the ring 181 radially to a terminal location exteriorly positioned with respect to the ring 181. A seal 186 between the stem 176 and the ring 181 is provided to prevent escape of material from the ring 181. Gaskets (not shown) on opposed faces of ring 181 seal the ring 181 between the adjacent faces of flanges 182 and 183. In the valve assembly 169, the ring 181 may be regarded as a valve plate.

The stem 176 is connected at its exterior end region with a variable actuator means 187, the actuator 187 being exteriorly located in a fixed position relative to the vessel 154 and functionally adapted to rotatably move the valve stem 176 in response to signal means applied thereto.

Level sensing means associated with the vessel 154 (preferably the lower regions thereof) is provided. Level sensing means 188 is adapted both to measure a fluid level in the vessel 154 and to generate a signal means in response thereto when the vessel 154 is functioning in the falling strand devolatilizer 152 with the valve assembly 169 at the downwardly extending end of the vessel 154.

A level controller 189 functionally interconnects the level sensing means 188 and the actuator means 187. The level controller means 189 is adapted, in response to signals from the level sensing means 188, to generate control signals for the actuator means 187, thereby to control rotational movements of the valve stems 176 and 177 in a predetermined manner. Thus, a predetermined variable aperture is maintainable between the valve assembly ring 181 and the valve disc 174.

Turning to FIG. 4–6, there is seen illustrated another devolatilizer embodiment of this invention herein designated in its entirety by the numeral 211. Devolatilizer 211 can be considered to be composed of a shell and tube heat exchanger assembly 212, a vessel 214 or first flash tank which comprises part of the embodiment 210 of the present invention, and a second flash tank 213.

The shell and tube heat exchanger assembly 212 is adapted for the input, passage through, and discharge from, the tubes thereof (not shown) of process fluid (not shown). Heat exchanger assembly 212 is further adapted for the receipt, passage through, and discharge from, the shell interior thereof (not shown) of heat exchange fluid for heat transfer from said heat exchange fluid to said process fluid.

Vessel 214 has a tapered lower region 216 which terminates in a discharge port 217. Vessel 214 also has a vapor take-off port formed by pipe and flange assembly 218. The assembly 218 communicates with the interior space 219 of vessel 214.

Vessel 214 is of double walled. jacketed construction for purposes of controlling the interior temperature of vessel 214 during operation of the devolatilizer 211.

Second flash tank 213 is likewise of double walled, jacketed construction for similar purposes. Tank 213 also has a tapered lower portion or region 221 which terminates in a discharge port, the flange 222 marking the position of such discharge port. A vapor take-off port is provided by the pipe and flange assembly 223 which communicates with the interior space 224 of flash tank 213.

Vessel 214 is positioned spacially above flash tank 213. The flange 226 at the lower end of vessel 214 about the discharge port 217 abuts against the top plate 227 of the second flash tank 213. Flange 226 is brought into sealing engagement with top plate 227 by a gasket (not shown) and flange 226 is secured to top plate 227 by nut and bolt assemblies (not shown). Vessel 214 is axially aligned with tank 213 and the discharge port 217 is aligned with an input port 228 in tank 213.

The heat exchanger assembly 212 is axially aligned with vessel 214 so that the tubes thereof (not shown) are in a generally vertical position. Heat exchanger assembly 212 protrudes down into vessel 214 and is supported on the top plate 229 of vessel 214 by a flange 231 secured to the heat exchanger assembly 212. Sealing means (not shown) is interposed between flange 231 and top plate 229 and top plate 229 and flange 231 are secured together by nut and bolt assemblies (not shown). The heat exchanger assembly 212, itself, is composed of two main subassemblies; a shell and tube core designated by the numeral 232 and a header designated by the numeral 233. The shell and tube core 232 are of conventional construction. The header 233 and the upper end of the shell and tube core 232 mate together by means of flanges 234 and 236, respectively, the flanges 234 and 236 having interposed therebetween appropriate sealing means (not shown) and being secured together by nut and bolt assemblies (not shown). An input port to header 233 is provided by pipe and flange assembly 237 which communicates with the interior (not shown) of header 233. The top of header 233 terminates in a flange 238.

Over header 233 is positioned pedestal 239. The base of pedestal 239 is mounted to a flange 241, the flange 241 being secured to the flange 238 by nut and bolt assemblies (not shown) with an appropriate sealing gasket (not shown) interposed therebetween.

In the region of discharge port 217 and input port 228 is mounted a valve plug 242. Referring to FIG. 5 for convenience, it is seen that the valve plug 242 is generally cross-sectionally circular and has a bottom portion 243 whose diameter is slightly less than the diameter of the mouth of discharge port 217. The mouth of discharge 217 serves as a valve plate means extending generally circumferentially about such mouth. This valve plate means is thus normally positioned with respect to the vertical axis of the vessel 214. The valve plug 242 has a upper portion 244 which is integral with the lower portion 243. The ouside walls of upper portion 244 extend generally conically upwardly towards a (hypothetical) apex along the vertical axis 230 of vessel 214. An elongated valve stem 246 extends from the apex region 247 of valve plug 242 upwardly. Valve stem 246 is conveniently secured to valve plug 242 by means of a threaded stub shaft 248 and nut 249, the stub shaft 248 being generally coaxial with valve stem 246 and being conveniently formed by reducing the diameter of the lower end of valve stem 246, or the like. The valve stem 246 extends from the valve plug 242 upwardly through vessel 214, through the shell and tube heat exchanger assembly 212 (there being an appropriate axial channel formed therein, not shown), through header 233 and into pedestal 239. Valve stem sealing means (not shown), but depending from flange 241, is provided. The valve stem 246 is thus maintained generally coaxial with the vertical axis of the assembly. As those skilled in the art will appreciate, many different contours for valve plug 242 may be employed without departing from the spirit and scope of the present invention.

Three valve plug guide rail means 251 are located circumferentially about port 217 in spaced relationship to one another, each valve plug guide rail extends generally parallel to the vertical axis downwardly from the discharge port 217 being secured to the bottom terminal wall of the vessel 214 here by welding. Each guide rail 251 has an edge portion 252 whose surfaces are generally equally distant from the vertical axis 230. Except for edge portions, any convenient body shape and any convenient number (provided there are at least three for centering purposes) of guide rail means may be employed in this invention. Since, as those skilled in the art will appreciate, the guide rail means can act as flow impediments in an operating device, a large number of such means preferably should be avoided. The guide rails are adapted to coact together and require the valve plug 242 to remain substantially centered on the vertical axis 230 when the valve plug 242 slides reciprocally along axis 230 together with the valve stem 246. The guide rails 251 maintain the valve plug 242 in a generally centered configuration relative to the valve plate formed by the mouth of discharge port 217. Conventional bearing means (not shown) in the region of flange 241 engage and guide the valve stem 246 during such reciprocal movements of the valve plug 242.

An actuator means, herein designated in its entirety by the numeral 253, is provided to move the valve stem 246 reciprocally in response to signal means applied to such actuator means 253. Pedestal 239 serves as a convenient base on which the actuator means 253 is mounted. The actuator means 253 has a reciprocating shaft 254. The lower end reciprocating shaft 254 is interconnected with the upper end of valve stem 246 by means of a collar 256. While any convenient conventional design for actuator means 253 may be employed, the actuator means 253 is preferably of the conventional pneumatic type well known to those skilled in the art. Observe the construction and interrelation between elements employed in the embodiment 211 is such that the actuator means is completely outside of the interior of the vessel 214 so that the valve plug 242 is regulated and controlled from a position remote from the valve plug 242 itself. Observe that, so far as the embodiment 211 is concerned, the heat exchanger 212 functions cooperatively with the pedestal 239 to provide support means in generally fixed spatial relationship to the vessel 214 which support means is located adjacent to a top port (not numbered) in the vessel 214 through which the valve stem 246 extends.

In order to measure process fluid level in the vessel 214, more particularly, in the lower most region of the vessel 214 of embodiment 211, a level sensing means herein-designated in its entirety by the numeral 257 is employed. The level sensing means 257 not only measures fluid level in the vessel 214 but also generates a signal means in response thereto which is representative thereof when the vessel 214 is functioning in the devolatilizer 211. In the devolatilizer 211, the level sensing means comprises a gamma ray emitter 258 and a gamma ray detector 259. Gamma rays emitted by emitter 258 pass through vessel 214 and are detected by the detector 259. Any convenient level sensing means, as those skilled in the art will appreciate, may be used for level sensing in the practice of the present invention, but level measurement by radiation is preferred.

A controller 261 adapted to apply control signals to the actuator 253 after comparing a signal from the level sensing means 257 to some set signal is provided. The controller 261 is generally responsive to a predetermined set signal and functionally interconnects the level sensing means 257 with the actuator means 253. Controller 261 can be of any suitable conventional design.

The interrelationship between the level sensing means 257, the actuator means 253, and the controller 261 is depicted in block diagrammatic form in FIG. 6. Thus, gamma radiation emitted and detected by, respectively, the radiation source and radiation detector, are fed to a transducer where a signal output is generated which is representative of variations of fluid level in the vessel 214, thereby to complete the level measurement. The output from the transducer is fed to a level controller where the level measurement signal is compared to a predetermined level set point and an output signal generated which is fed to the actuator means associated with the valve stem 246, the whole being referenced in FIG. 6 as the level control valve.

Other and further embodiments of the present invention will be apparent to those skilled in the art from a reading of the present specification and drawings.

What is claimed is:

1. Improved falling strand devolatilizer apparatus comprising:

A. a shell and tube heat exchanger means adapted for input, passage through, and discharge from, the tubes thereof of a process fluid and further adapted for receipt, passage through, and discharge from, the shell interior thereof of a heat exchange fluid whereby for heat transfer from said heat exchange fluid to said process fluid occurs during operation thereof,
 B. a first and a second vessel, each vessel having:
   1. a generally tapered lower region terminating in a discharge port,
   2. a vapor take-off port in an upper portion thereof,
   3. an input port means adapted to discharge process fluid therein at a point between said discharge port and said vapor take-off port,
   4. jacket means with heat exchange fluid entrance and exit ports and adapted to heat said vessel, and first vessel being adapted to be positioned spatially above said second vessel,
 C. interconnection means joining the discharge port of said first vessel with the input port means of said second vessel,
 D. said heat exchanger means being interconnected with said first vessel and adapted to have the discharge end portions of said tubes thereof pass into and be in communication with the interior of said first vessel,
 E. first gas pump means interconnected with said vapor take-off port of said first vessel and adapted to maintain desired pressures in said first vessel,
 F. second gas pump means interconnected with said vapor take-off port of said second vessel and adapted to maintain desired pressures in said second vessel but below the desired pressures maintained in said first vessel,
 G. liquid pump means interconnected with the discharge port of said second vessel and adapted to remove process fluid therefrom without loss of desired pressure in said second vessel,
 H. variable fluid transfer plug valve means axially connected to said interconnection means and adapted to vary the rate of process fluid flow from the discharge port of said first vessel through said interconnection means and into the input port means of said second vessel,
 I. actuator means engaged with said fluid transfer valve means and adapted in response to control signals applied thereto to operate said fluid transfer valve means,
 J. level sensing means associated with said first vessel and adapted to measure fluid level in said lower region thereof and to generate a signal representative of fluid level when said first vessel is generally oriented so as to have its tapered lower region directed downwardly,
 K. controller means functionally interconnecting said level sensing means with said actuator means and responsive to a predetermined set signal and to signals from said level sensing means, said controller means being adapted to apply control signals to said actuator means after comparing said level sensing means signal to said set signal whereby a predetermined rate of process fluid flow from the discharge port of said first vessel through the input port means of said second vessel is maintainable when said devolatilizer apparatus is operating with first and said second vessels generally vertically oriented.

2. The devolatilizer apparatus of claim 1 wherein said first and said second gas pump means are each interconnected with said first and said second vessels, respectively, through first and second condenser means respectively, said such condenser means being adapted to condense condensable vapors removed from said vessels during operation of said devolatilizer apparatus.

3. The devolatilizer apparatus of claim 1 wherein said interconnection means comprises a conduit means adapted to expand and contract in a longitudinal direction in response to heating and cooling.

4. The devolatilizer apparatus of claim 1 wherein said level sensing means, controller means, actuator means and variable fluid transfer valve means are adapted to maintain predetermined pressure differentials between said first vessel and said second vessel.

5. The devolatilizer apparatus of claim 1 wherein said level sensing means comprises a gamma ray emitter and a gamma ray detector.

* * * * *